(12) United States Patent
Lehwalder et al.

(10) Patent No.: US 11,231,761 B2
(45) Date of Patent: Jan. 25, 2022

(54) POWER MONITORING FOR A PROCESSING PLATFORM

(71) Applicant: Intel Corporation, Santa Clara, CA (US)

(72) Inventors: Philip Lehwalder, Hillsboro, OR (US); Robert Santucci, Gilbert, AZ (US); Tod Schiff, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/643,492

(22) PCT Filed: Sep. 29, 2017

(86) PCT No.: PCT/US2017/054420
§ 371 (c)(1),
(2) Date: Feb. 28, 2020

(87) PCT Pub. No.: WO2019/066928
PCT Pub. Date: Apr. 4, 2019

(65) Prior Publication Data
US 2020/0201408 A1 Jun. 25, 2020

(51) Int. Cl.
*G06F 1/28* (2006.01)
*G06F 1/3296* (2019.01)

(52) U.S. Cl.
CPC ............. *G06F 1/28* (2013.01); *G06F 1/3296* (2013.01)

(58) Field of Classification Search
CPC ............................. F24F 11/523; G05B 19/042
See application file for complete search history.

(56) References Cited

U.S. PATENT DOCUMENTS

| | | |
|---|---|---|
| 2003/0230935 A1* | 12/2003 | Radley ................... H02J 9/005 307/64 |
| 2008/0168287 A1 | 7/2008 | Berry et al. |
| 2012/0159198 A1 | 6/2012 | Naffziger et al. |
| 2013/0124885 A1 | 5/2013 | Davis et al. |
| 2013/0159575 A1 | 6/2013 | Gooding et al. |
| 2016/0041608 A1 | 2/2016 | Lee |
| 2016/0378172 A1* | 12/2016 | Alexander ............. G06F 1/329 713/320 |

OTHER PUBLICATIONS

International Search Report and Written Opinion dated Jun. 26, 2018 for International Application No. PCT/US2017/054420, 13 pages.

* cited by examiner

*Primary Examiner* — Mark A Connolly
(74) *Attorney, Agent, or Firm* — Schwabe, Williamson & Wyatt, P.C.

(57) ABSTRACT

Power monitoring circuitry is provided to monitor an input system power profile of processing tasks executing on a processing platform. An input is provided to receive from the processing platform, a processing system signal indicating a power being consumed by the processing platform. A counter is provided to store a count value corresponding to an accumulated number or amount of times that a warning threshold condition associated with a warning threshold value is satisfied by the received processing system signal in a count-accumulation time interval. The count value is supplied to a power control circuit of the processing platform via a bus in response to a read request from the power control circuit, the power control circuit being responsive to the count value to control a performance level of the processing platform.

25 Claims, 9 Drawing Sheets

POWER MONITORING FOR A PROCESSING PLATFORM

CROSS REFERENCE TO RELATED APPLICATIONS

The present application is a national phase entry under 35 U.S.C. § 371 of International Application No. PCT/US2017/054420, filed Sep. 29, 2017, entitled "POWER MONITORING FOR A PROCESSING PLATFORM", which designated, among the various States, the United States of America. The disclosure of International Application No. PCT/US2017/054420 is hereby incorporated by reference in its entirety.

TECHNICAL FIELD

Embodiments described herein generally relate to power monitoring circuitry and power control circuitry for a processing platform such as a System on Chip (SoC) device. More particularly, embodiments relate to counting an accumulated time for which a processing system signal satisfies a threshold condition.

BACKGROUND

Processors have dynamically changing power requirements depending on processing application demands. A number of different performance states of a processor may be implemented, for example, by selecting a processor frequency and a corresponding processor core voltage Vcc. Processor power=Vcc*K+leakage, where K is a relative constant based on processor frequency and capacitance. Leakage is approximately a constant corresponding to power wasted as a result of applying a voltage to a transistor. Thus the processor frequency and Vcc may be increased when processing workload is high to run faster and resulting in increased power consumption, whilst processor frequency and Vcc may be reduced when the processor is has a low workload or is idle to reduce processor consumption. The processor performance level may be set based on both processing workload and a maximum capacity of a corresponding power supply.

A power control unit of a processing platform may receive information from one or more sensors of the processing platform to sense variations in factors affecting performance of the processing platform such as operating frequency, operating current, operating voltage, battery charge levels etc. The power control unit may control at least one of a voltage regulator, a power source and one or more components of the processing platform to modify their operations to control processing performance.

Tolerance of a processing platform to sudden increases in processing loads (i.e. transients) is desirable because the sudden increase in workload can result in a momentary drop in voltage below a desired constant level (so called "voltage droop"). On the contrary, when the peak in processing workload falls, the system voltage may exhibit a peak in the voltage level. If the system voltage drops too low, such as below a minimum system voltage, as a result of power transients there may be a risk of inadvertent system shutdown (i.e. system crash). Processing platforms may be arranged to have a tolerance to power transients by providing sufficient headroom between: (i) a determined maximum power capacity of an available power supply; and (ii) a target processing platform performance level that the power control unit is permitted to set.

System power may be monitored by the processing platform polling data telemetry registers of the power supply or of one or more associated voltage regulators. For example, to monitor system power, the power control unit of the processing platform may poll registers of a voltage regulator via a bus such as a Serial Voltage Identifier (SVID) bus. There is likely to be limited bandwidth on the bus, which means that low sampling rates (for example, 100 μs) tend to be used. At the available low sampling rates it is unlikely to be possible to distinguish between two scenarios of equivalent average power:

1) "Constant Workload" where the SoC or other processing platform continually draws the average power; and (2) "Bursty Workload" where the SoC or other processing platform intermittently draw very high power bursts, significantly exceeding the average with the remaining time below average power.

As a consequence, to safeguard against system crash, the processing performance level of the processing platform is set by the power controller to accommodate the worst case, that is, the bursty workload. This means that the available maximum power capacity of the power supply is not fully utilized to boost processing performance during periods when the workload is more constant. Thus potential processing performance gain derivable from a power supply can be lost as a result of the known ways of safeguarding against system crash.

BRIEF DESCRIPTION OF THE DRAWINGS

Embodiments described herein are illustrated by way of example, and not by way of limitation, in the figures of the accompanying drawings in which like reference numerals refer to similar elements.

DESCRIPTION OF EMBODIMENTS

Illustrative embodiments of the present disclosure include, but are not limited to, methods, systems, apparatuses and machine readable instructions for monitoring power of a processing platform such as a processor or a SoC to accumulate a count corresponding to an accumulated number (or amount) of times that a warning threshold condition associated with the warning threshold value is satisfied by the received processing system signal in a count-accumulation time interval. Monitoring the count, which can be incremented at a minimum time resolution and allowing a power control circuit to read the count at a chosen reading rate may allow a distinction to be made between more bursty and more constant processing workloads which can facilitate more efficient power control and performance tuning of a processing platform.

Some embodiments represent the count in a way (a so-called "encoding") that allows fewer bits to be used to communicate a given count value and providing for a larger range of count values to be represented by a given number of bits relative to counts that do not use the encoding. This can facilitate more rapid polling of processing system signals such as a system power signal, a system current signal or a system voltage signal. As a result, a clearer distinction can be made between bursty and continuous workloads, which means that performance tuning of the processor can be more efficiently and accurately performed. Further embodiments may detect when a critical power threshold has been breached and trigger a power reduction to reduce the likelihood of processing errors or a system crash.

Figure 1:
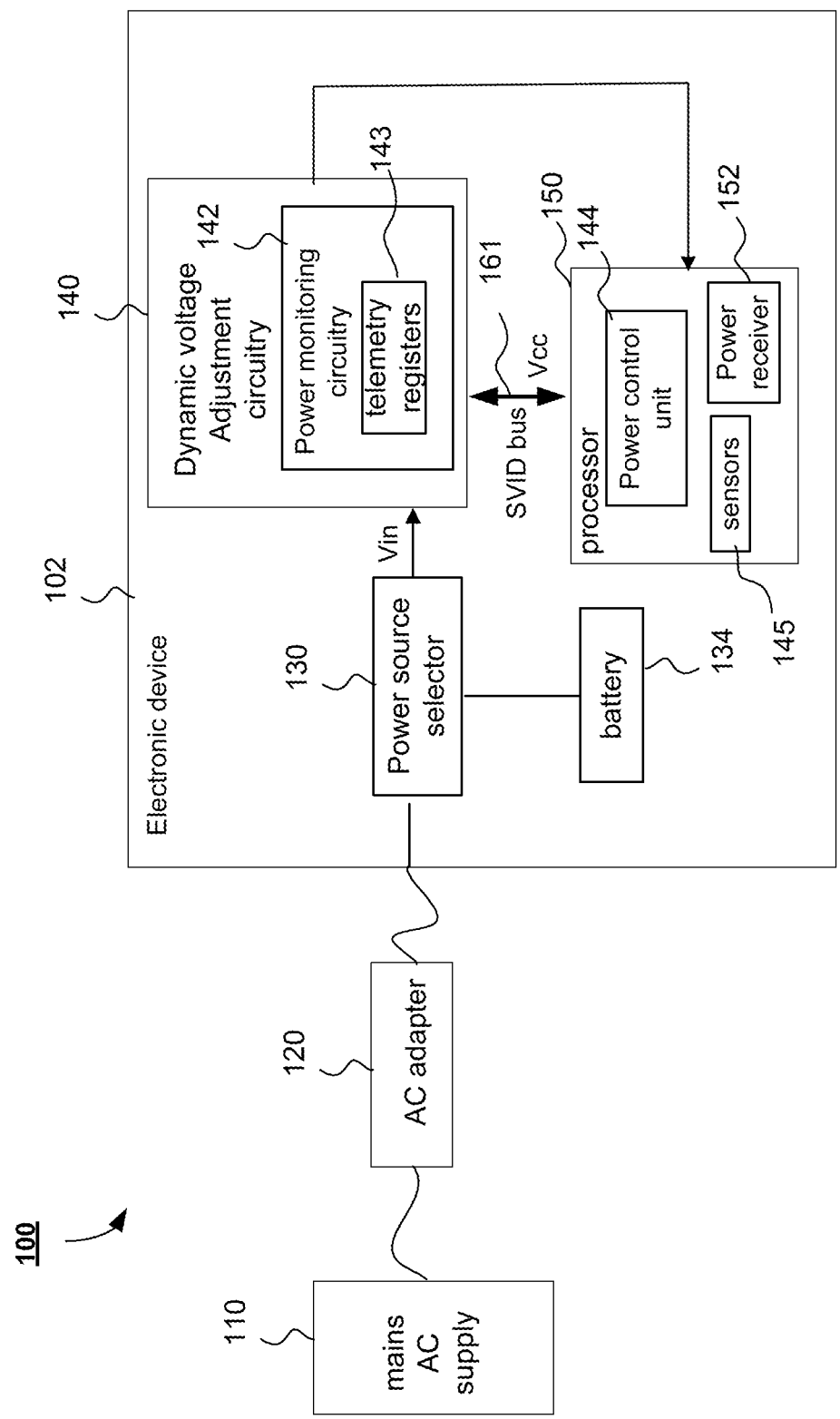
FIG. 1 schematically illustrates a power distribution system for an example processing platform corresponding to a laptop computer.

FIG. 1 schematically illustrates a power distribution system 100 for an electronic device 102, such as a laptop computer. The system comprises: an Alternating Current (AC) power supply 110 from a mains plug (e.g. 120V or 240V mains supply); an AC adapter 120 to convert the mains AC voltage to a lower Direct Current (DC) voltage, Vin, for example 16 to 24V; a power source selector 130 to select an internal battery 134 as a power source when the AC mains power 110 is not available; a set of dynamic voltage adjustment circuitry (DVAC) 140, which takes the DC voltage, Vin, and reduces it to Vcc to match a voltage requirement of a processor 150.

The DVAC 140 performs the function of a voltage regulator and has a set of power monitoring circuitry 142 and associated data telemetry registers 143 to store data. The power monitoring circuitry 142 provided within the DVAC 140 monitors power drawn from the power source by the electronic device 102. Power is supplied from the selected power source to a power receiver 152 of the processor 152 via the DVAC 140. Although the power monitoring circuitry 142 is shown as part of the DVAC 140 in the FIG. 1 example, it may alternatively be provided within the processor 150, as part of the power supply (as described with reference to FIG. 2 below) or directly coupled to an interconnection between the processor 150 and other components of the electronic device 102. The power sources and DVAC 140 may communicate with the power monitoring circuitry 142 wherever it is located, to report their power-related status.

The processor 150 of the system has a power control unit 144, one or more sensors 145 and a power receiver 152. The sensors 145 may be coupled to the power control unit 144 of the processor 150 to provide information such as charge levels of the battery 134 obtained from a fuel gauge. The sensors 145 may sense variations in factors affecting power consumption of the electronic device such as temperature operating frequency, operating voltage, operating current, power consumption, over current, over-discharge, under voltage etc. The sensors 145 in the FIG. 1 example are provided within the processor 150, but in alternative examples they may be provided proximate to other components of the electronic device 102 outside of the processor 150 or within individual processor cores in the processor 150, for example.

A bus 161, such as an SVID bus connects the DVAC 140 to the processor 150. The electronic device may have further components (not shown) such as memory and one or more further processors connected to the processor via an interconnect (not shown). In multi-processor systems, additional power sources and/or DVACs 140 may be used. For example, each processor may have a corresponding power source and DVAC. The DVACs may be coupled to the processor 150 via a single power plane supplying power to multiple processor cores or, alternatively, multiple power planes may be used such that each power plane supplies power to a different processor core or group of processor cores. A single processor such as the processor 150 may comprise one or a plurality of processor cores (not shown) as components.

In the example of FIG. 1, the power source comprises the AC power supply 110, the AC adapter 120, the battery 134 and the power source selector 130. In other examples, the power supply may comprise a direct current (DC) power source. The battery 134 may comprise one or more battery packs with batteries arranged in series or in parallel. The processor 150 may operate at a plurality of different operating voltages and corresponding frequencies corresponding to different performance levels. The DVAC 140 may be a separate component relative to the power source(s) 110, 140 and the processor 150, or may alternatively be integrated with the processor (as illustrated in the FIG. 2 Example) or the power supply.

The DVAC 140 may be arranged to adjust Vcc based on at least one of the activity of the processor 150 and a maximum power available from the selected power source 100 or 134. When the battery 134 is selected as the power source then Vcc may depend on the charge level of the battery, reducing when the battery charge level is low. For example, the power control unit 144 of the processor 150 may set a target processor frequency for a given processor performance level. If the target frequency is higher than the current processor frequency then Vcc may be increased and the increased value for Vcc may be signaled by the bus 161 to the DVAC 140 and once the voltage is established, a phase locked loop (not shown) may lock the processor onto the target frequency. If the target frequency is lower than the current frequency then the phase locked loop may lock onto the target frequency and then the processor 150 may transition to a lower Vcc by signaling a target voltage to the DVAC 140 on the bus 161.

Thus, the bus 161 may used to provide a voltage setpoint Vcc to the DVAC 140 to power the processor 150 based on a target processor performance level set by the power control unit 144. The processor 150 may use the bus 161 to read power from the DVAC 140 to monitor how much power the processor 150, memory (not shown), and rest of the system are consuming. The bus 161 may be, for example, an SVID bus having a three-wire interface including a clock, an alert (interrupt) and a data wire.

The power monitoring circuitry 142 of the DVAC 140 maintains counts depending on power threshold comparisons at a resolution of, for example 1 μs or 2 μs, to enable a power profile of the electronic device 102 for one or more specific tasks being executed on the processor 150 in real time. The DVAC 140 may use the power profile data compiled by the power monitoring circuitry 142 to tune power levels of the processor 150 to improve performance and to increase opportunities for the processor 150 to enter high performance states within the capability of a given power supply. High performance states such as "turbo" states may be set in which the processor 150 is driven harder for periods ranging, for example, from hundreds of μs to tens of seconds. The maximum turbo level of the processor 150 may be adjusted depending on the maximum output capacity of the power supply with respect to a minimum system input voltage. This may depend on the remaining state of charge of the battery 134. Accessibility to profiling data for system power, system current or system voltage at high resolutions (e.g. the order of one or more μs), which is possible using a counter to accumulate a number of times a warning threshold condition is satisfied by a system signal in a predetermined time to distinguish between different workload characteristics, makes it easier to set turbo states. Thus, example embodiments can boost system performance and yet protect against inadvertent system shutdown.

In previously known systems, the processor 150 would poll the DVAC 140 once around every 100 μs (or at longer time intervals) to determine the input supply power. These polling rates are likely to be too slow to measure any high speed power changes. However, according to embodiments, power monitoring circuitry 142 may be provided locally within the DVAC 140 (an example of a voltage regulator) so that the processor 150 does not have to poll at μs rates to achieve finer granularity when performing profiling of system power. This may avoid over-utilization of bandwidth of the bus 161, reducing the risk of impeding other important bus based data transfer. Bandwidth of the bus 161 may be limited and in high demand. The bus 161 word length may be, for example, 8 bits. The bus 161 may be, for example, an SVID bus.

Figure 2:
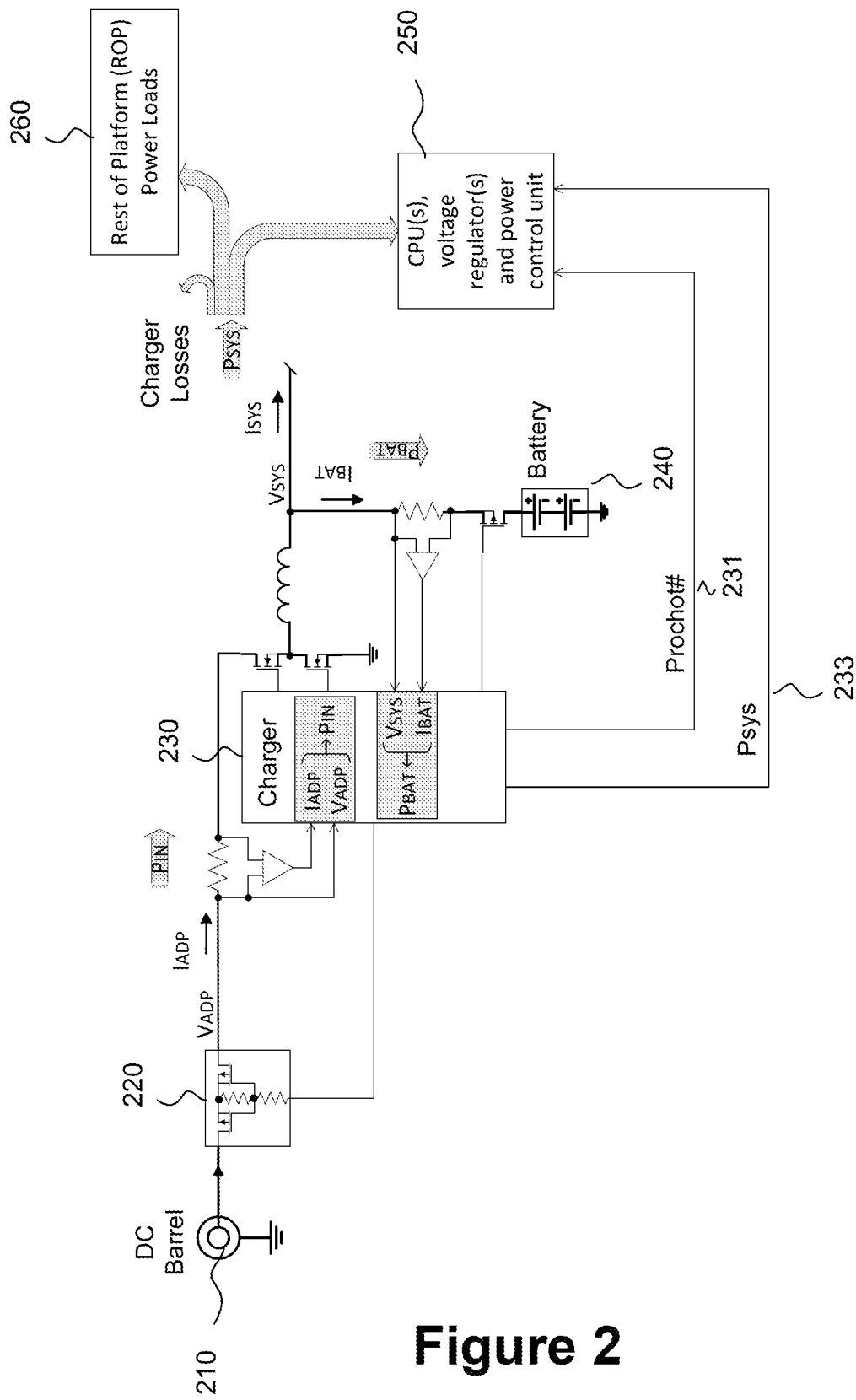
FIG. 2 schematically illustrates a processing platform comprising power monitoring circuitry.

FIG. 2 schematically illustrates a processing platform 200 comprising power monitoring circuitry. The platform comprises: a DC barrel 210, an isolation switch 220, a battery charger 230, a battery 240, a SOC and voltage regulator unit 250 and power loads 260 corresponding to the rest of the platform (ROP). The SOC 250 may comprise one or more processors, each processor having one or more cores. The SOC and voltage regulator unit 250 also comprises a power control unit performing functions as described for the power control unit 144 of FIG. 1. In the FIG. 2 embodiment, the charger 230 incorporates the power monitoring circuitry according to the present technique, whereas in FIG. 1, the power monitoring circuitry is a component of the DVAC 140 (voltage regulator). The power monitoring circuitry may be provided in further alternative locations. A power, $P_{BAT}$, from the battery 240 may have a corresponding current $I_{BAT}$ and voltage $V_{BAT}$, whilst a power input $P_{IN}$ to the charger 230 may have a corresponding adapter current $I_{ADP}$ and voltage $V_{ADP}$. A system power $P_{SYS}$ 233 and system current $I_{SYS}$ and system voltage $V_{SYS}$ are to supply both the SOC/voltage regulator unit 250 and the rest of the platform 260, incurring some charger losses on the way. The SOC/voltage regulator unit 250 of FIG. 2 corresponds to a combination in a single element of both the DVAC 140 and the processor 150 if the FIG. 1 example. The battery 240 may draw power from the charger 230 until it is fully charged. The charger 230 may output a signal "Prochot #" 231 to the SOC and voltage regulator unit 250. The "Prochot #" is a signal 231 that may be used to "throttle" the one or more processors to activate a power reduction in response to a threshold condition being triggered. For example, the "Prochot #" signal 231 may be asserted when at least one of:

1) Vsys has an under-voltage detect
2) Iadp has an over-current detect
3) Ibat has an over-discharge detect All of the above three detect levels may be programmable. Each of the above three conditions indicates that the processing platform may be attempting to draw more power than is available from the power supply and thus risking inadvertent system shutdown. For example, a voltage "droop" corresponding to a dip below the otherwise constant operating level may result from a power transient associated with a heavy processing workload. When higher than average power is drawn by the processing platform, the system power and system current tend to increase whereas the system voltage tends to drop down, potentially below a minimum voltage required for operation of the processing platform. The "Prochot #" signal 231 protects the processing platform from system failure that can arise, for example, due to Psys exceeding a power available from a power supply.

In a multi-processor system the "Prochot #" signal 231 may be asserted to two or more processors, for example, all processors of a processing platform, to implement power throttling to protect against an inadvertent system shutdown.

Depending on how the threshold condition is configured, it may be required for a given system signal to exceed a threshold (such as a critical power for Psys or a critical current for Isys) or for the system signal to be below a threshold (such as a critical voltage for Vsys) to satisfy the threshold condition. In other examples being greater than or equal to the threshold (for Psys or Isys) or less than or equal to the threshold (for Vsys) may satisfy the threshold condition. At least one of Psys, Isys or Vsys or Iadp or I bat or any other appropriate signal may be monitored to trigger a warning signal or a critical signal such as the throttle signal 231. In some embodiments, "Prochot #" 231 may be asserted when a processor temperature is at least a critical temperature, such as a maximum safe operating temperature.

The charger 230 also outputs the "Psys" signal 233 to the SOC and voltage regulator unit 250. The charger 230 of the FIG. 2 example:
   i. Measures Iadp and Vadp
   ii. Measures Ibat and Vbat
   iii. Computes Pin and Pbat
   iv. Computes Psys=Pin−Pbat (Pbat>0 when the battery charging; Pbat<0: discharging)
   v. Outputs a current Isys, proportional to Psys 233

Figure 3:
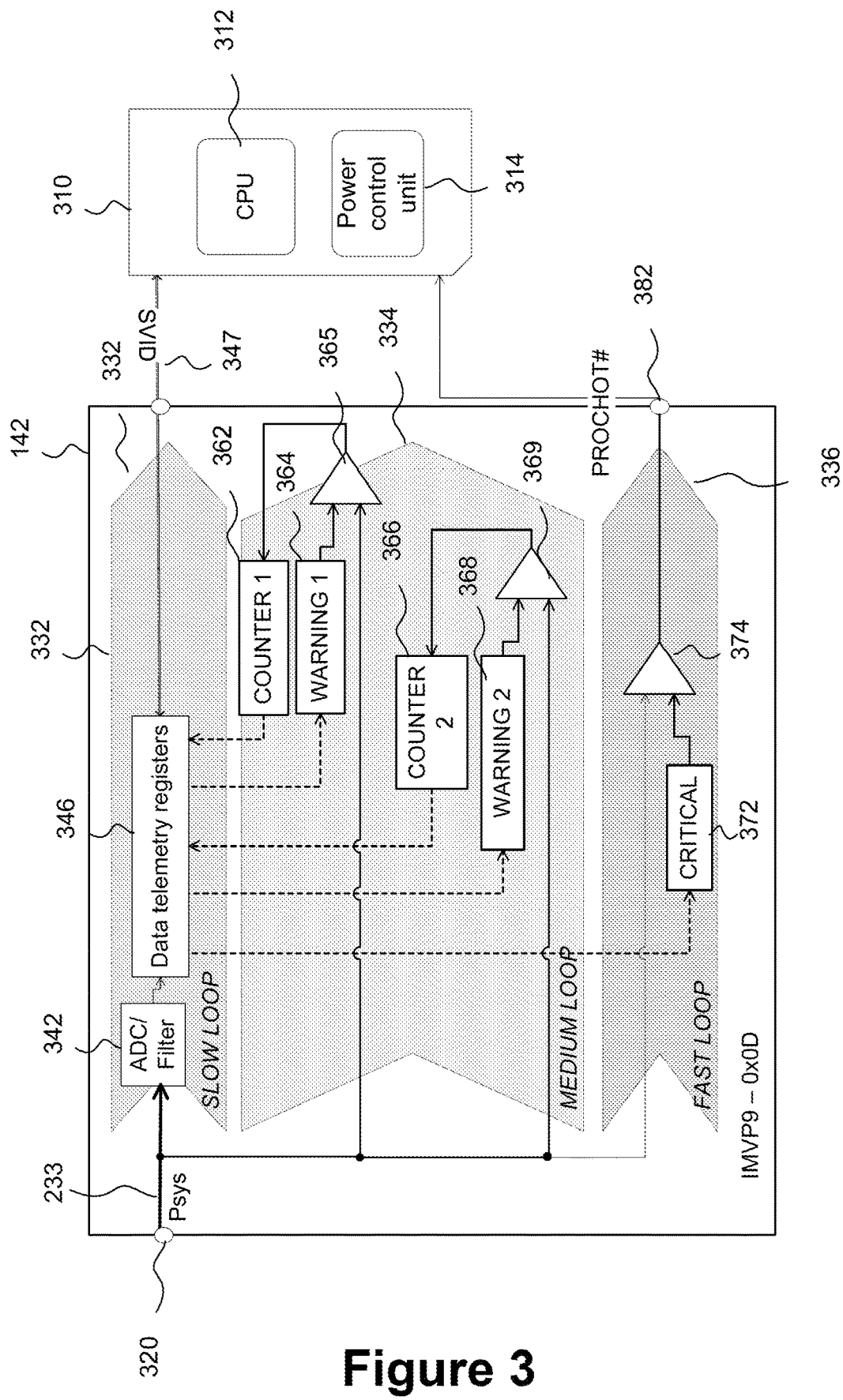
FIG. 3 schematically illustrates the power monitoring circuitry of FIG. 1 in more detail.

In the embodiment of FIG. 2, the input power source is a combination of the battery 240 and the charger 230. In alternative embodiments in which the processing circuitry is, for example, a server or a desktop computer, the system input power supply may be a "silver box" power supply. The SoC and voltage regulator 250 of FIG. 2 receives a system signal, such as the Psys 233 signal and monitors when the system signal satisfies one or more threshold conditions. The threshold conditions may relate to a minimum value for Vsys below which system failure is likely to occur or a maximum value of Psys or Isys, above which system failure is likely to occur. The thresholds could alternatively be set to discriminate between different bands of power consumption, for example, rather than to indicate that a critical threshold has been crossed. Power control to activate a power reducing feature of the SoC and voltage regulator 250 may be performed depending on a count of how many times the system signal has satisfied the threshold condition. The SoC and voltage regulator 250 may be responsive to the throttle signal "Prochot #" to activate a power reducing feature, for example to reduce a processor frequency within a predictable time window of the throttle signal being asserted to reduce the risk of inadvertent system failure. It is not previously known to have a throttle signal triggered based on system power. FIG. 3 schematically illustrates the power monitoring circuitry 142 of FIG. 1 in more detail. The power monitoring circuitry 142 is also a component of the component 250 of the FIG. 2 embodiment. The power monitoring circuitry 142 may be used to monitor the power of any type of electronic device that is intelligent enough to use the power monitoring information. The device for which the power is being monitored shall be denoted a processing platform 310. The processing platform 310 may comprise one or more processors, each of which may have one or more cores, and which may further comprise additional platform components that draw power as explained in the description of FIG. 1 above. The power monitoring circuitry 142 may adjust the power of the one or more processors of the processing platform and/or may adjust the power of any processing platform component controlled by the one or more processors. The processing platform 310 may correspond, for example, to a System on Chip (SoC) or to an electronic device such as a laptop computer or to a subsystem of an electronic device. A SoC may include one or more Central Processing Unit (CPU) cores and may further comprise one or more Graphics Processing Unit core and an Input/Output interface. The SoC may include more or less components relative to components discussed with reference to other Figures described herein. In the FIG. 3 example, the processing platform comprises a power control unit 314. In one embodiment, the SoC and its components are provided on one or more Integrated Circuit die, which are packaged into a single semiconductor device.

The FIG. 3 arrangement comprises the processing platform 310 comprising a central processing unit 312 and the power control unit 314. The power control unit 314 may control a performance level of the CPU 312 based on information obtained from the power monitoring circuitry 142. The power monitoring circuit 142 comprises a slow loop 332, a medium loop 334 and a fast loop 336 for sampling a system power signal Psys 233 from the charger 230 (see FIG. 2), which is received at the power monitoring circuitry via an input 320. The slow loop 332 in this example samples an averaged Psys signal 233 at a rate of around one hundred µs and comprises an ADC and anti-aliasing (AA) filter 342, and a Voltage Regulator (VR) telemetry system 346, which communicates data with the data processing apparatus 310 via the SVID bus 347. Slow loop 332 data is stored to a register location 431, the data having been filtered to, in this example, a 100 µs filter time at a constant rate. Averaging of the data in this way means that reads by the SoC should not miss any information.

The AA filter 342 is used to attenuate higher frequencies (greater than a Nyquist frequency) to prevent aliasing. According to Nyquist sampling theorem, a maximum frequency of the input signal should be less than or equal to half of the sampling rate and the low sampling rate of around 100 µs for the slow loop 332 means that the AA filter 342 is appropriate to bandwidth-limit the Psys signal 233. Thus the AA filter 342 provides for good samples at low sampling rates. Low sampling rates can make it difficult to distinguish between two situations of equivalent average power comprising:

(i) a constant workload where the SoC or other processor platform corresponding to the CPU 312 continually draws an average power; and (ii) a bursty workload where the SoC or other processor platform intermittently draws high-power bursts exceeding the average power within intervening periods of drawing below or well below the average power.

Low sampling rates may also inherently delay when changes in the input system power, Psys 233, are observable at the Voltage Regulator (VR) telemetry system 346 of the power monitoring circuitry 142. In previously known systems in which the sampling rate was limited to low sampling rates of around 100 µs, there was a need for a power supply that was capable of delivering the average power required by the CPU 312 workloads but yet has sufficient headroom to tolerate any large power transients for; (i) the total time required for the high transient power event to be observable; plus (ii) the time required for the CPU 312 to reduce its power demand after detecting the high transient power event. In previous solutions, to prevent critical power conditions where the maximum power is exceeded by demands of the processing system, the power supply is arranged to have headroom to support any high peak power transient events. This may lead to inefficiencies when continuous workloads do not exploit this peak power capability leaving potential performance enhancements unused.

By way of contrast, according to embodiments, a higher time resolution, of the order of one or two microseconds for example, is provided for profiling the Psys signal 233. This provides the capability for the power monitoring circuitry 142 to dynamically measure system power events at high resolution and to tune the CPU 312 or SOC power levels to improve processing performance and to efficiently utilize any available power supply headroom to achieve processing performance gains. For example, it is likely to be safer to decrease processor voltage for a constant workload than for a bursty workload having an equivalent average power. This is because the more constant workload is less likely to be characterized by power transients, which could result in a system crash.

The medium loop 334 determines a system power profile at a medium temporal resolution of around one or two µs. The medium loop 334 comprises: a first counter 362 and a first warning threshold storage element 364 and a first comparator 365. The first comparator 365 receives as a first input the system power signal Psys and compares this with a further input corresponding to a first warning threshold read from the first warning threshold storage element 364. An output of the first comparator 365 enables the first counter 362 so that when Psys exceeds the first warning threshold the first counter 362 is incremented. The medium loop further comprises a second counter 366, which is incremented when a second comparator 369 has an output indicating that a comparator input corresponding to Psys exceeds a value fed to the second comparator 369 from a second warning threshold storage element 368.

It will be appreciated that the comparisons of Psys against the first and second warning thresholds could be implemented in alternative ways such as triggering a change in the count when Psys is greater than or equal to the threshold rather than only when Psys exceeds the threshold. Similarly, the first and second counters 362, 366 could be arranged to decrement a count from a non-zero starting value to indicate how many times a corresponding warning condition has been triggered. Instead of the Psys signal, the Vsys or Isys signal may be used to monitor the processing platform and to trigger one or more counters depending on one or more thresholds. It may be useful, for example, to count transitions of Vsys below a minimum voltage threshold because this could indicate a risk of inadvertent system failure. However, any system signal may be compared against a threshold by the circuitry of FIG. 3 to count transitions above or below a chosen threshold value. Transients of a signal above and/or below a given threshold when a processing load is suddenly increased or decreased may be conveniently monitored using the arrangement of counters and comparators.

Outputs of each of the first counter 362 and the second counter 366 may be stored in one of the data telemetry registers 346. The first counter 362 and second counter 366 measure each time period (of potentially variable duration) for which the system input power Psys 233 exceeds the respective counter thresholds for up to one second in length, for example, with a microsecond resolution without overloading data telemetry registers 346. The first warning threshold 364 and the second warning threshold 368 may be programmable and can be adapted to achieve a desired system profiling task (power, current or voltage). The two thresholds 364, 368 may be independently set. In this example, each counter has a 19-bit value as will be described in more detail below with reference to FIG. 5. The data telemetry registers 346 comprises one register (shown in FIG. 4) which stores at least one warning threshold value for the system power (or current or voltage). In this example the first warning threshold value is read from the register and supplied as an input to the first comparator 365 and the second warning threshold value is similarly read from a register and supplied as an input to a second comparator 369.

In addition to the system power profiling event counters 362, 366, the power monitoring circuitry 142 further comprises the fast loop 336 having a critical threshold value 372 supplied as an input to a critical alert comparator 374, with the system power (Psys) signal 231 being supplied as the second input to the comparator 374. Similarly to the first and second warning thresholds stored in circuit elements 364, 368, the critical threshold value 372 is obtained from a register of the data telemetry registers 346. The critical threshold value 372 together with the critical value comparator 374 are used determine when a critical power threshold condition should be triggered to activate a power reducing feature of the data processing apparatus 310. Any such triggering indicates that the supply power drawn by the data processing apparatus 310 has exceeded the available power supply capability, making the data processing apparatus 310 vulnerable to a system crash. The power monitoring circuitry 332 has a critical warning output port 382, which communicates to the data processing apparatus 310 a signal indicating that critical power has been exceeded, allowing the data processing apparatus 310 to take action to reduce power rapidly within microseconds of the occurrence of the critical power condition. In the FIG. 3 embodiment, the slow loop and medium loop implement counters but the fast loop does not use a counter. Instead of a counter, the fast loop performs an instantaneous comparison, sampling at a high resolution and sends a hardwired critical power warning signal to the data processing apparatus 310 via the critical power output port 382.

Although the Psys signal 233 can correspond to power monitored directly, for example, via a power sensor signal from the charger 230, alternative embodiments can use the same Psys input signal 233 to be the monitored signal for detecting "voltage droop" on the power supply output rather than for detecting the power supply transient power peaks. The voltage droop can provide an indirect measure of transient power events, with power profile peaks being reflected by, for example, the corresponding voltage dropping below a predetermined minimum voltage threshold. Further alternative embodiments may use a current profile to trigger a warning signal or a critical signal if, for example, a magnitude of Isys exceeds a current threshold. It is not previously known to provide power monitoring circuitry configurable to measure different system signals in different modes. The monitoring of a system power signal to trigger a throttle signal differs from previously known systems which may use the system voltage.

Figure 4:
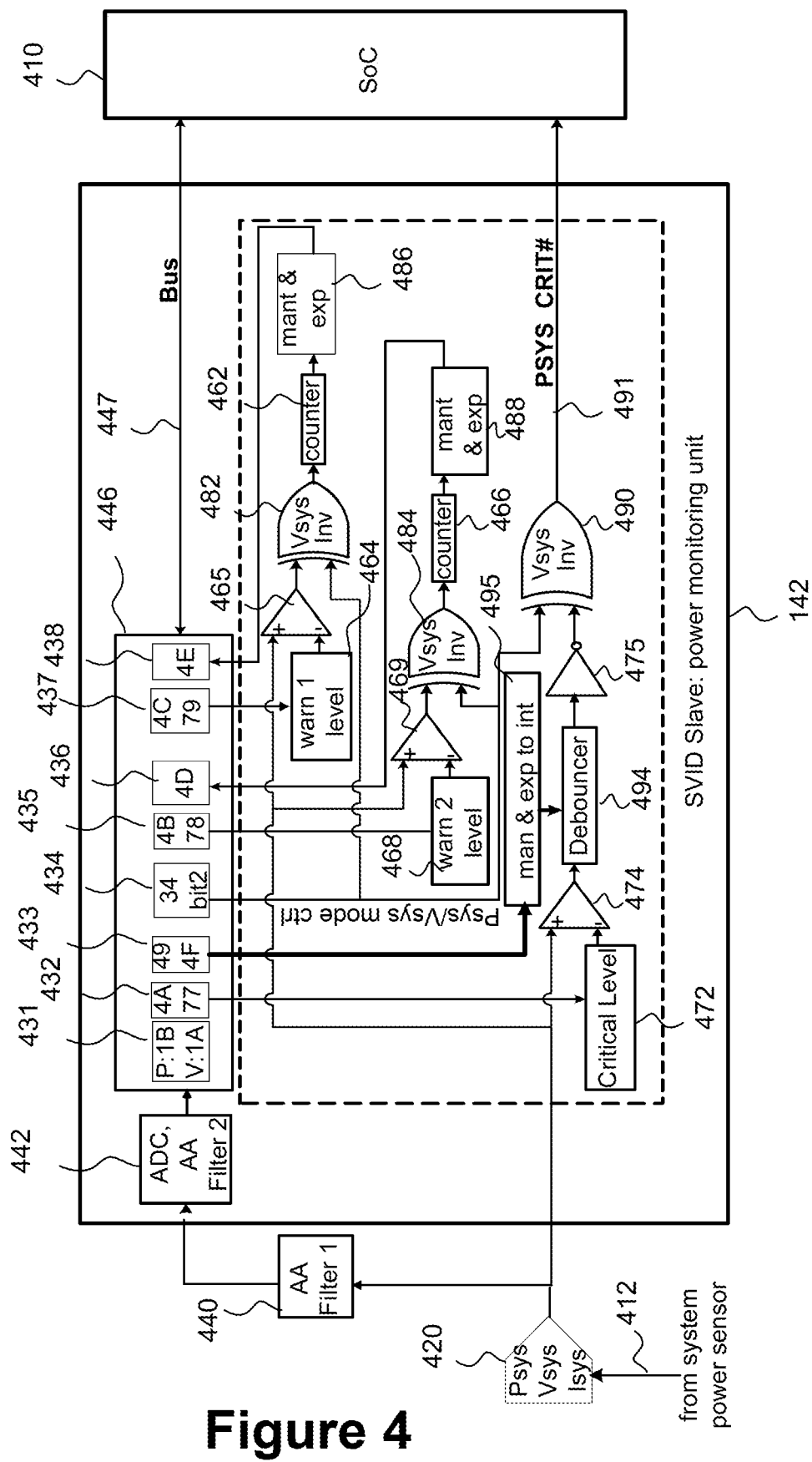
FIG. 4 schematically illustrates the voltage monitoring circuitry of FIG. 1 in more detail than the schematic illustration of FIG. 3.

FIG. 4 schematically illustrates the voltage monitoring circuitry 142 of FIG. 1 in more detail than the schematic illustration of FIG. 3. A SoC 410 is one example of a processing platform in which the power monitoring circuitry of the present technique may be implemented. A signal 412 by a system input power sensor such as the charger 230 in FIG. 2 is supplied as an input to the monitoring circuitry 142 via an input port 420. In this case, a processing system signal 420 such as Psys, Vsys or Isys may be supplied as input to the power monitoring circuitry 142. The processing system signal 420 may be an analogue signal having a delay of less than 2 μs, for example, bit it is not limited to this value. The delay of the system signal 420 should, if possible, be less than a minimum resolution of the counter, otherwise information can be lost. A first AA filter 440 receives the analogue processing system signal 420 prior to the signal being supplied to an ADC filter 442, after which a second anti-aliasing filter may be provided. An output of the ADC/AA filter 442 may then be supplied to a register file 446 of the voltage regulator telemetry system. In this example, the register file 446 is read via a serial bus 447. Similarly to the FIG. 3 embodiment, the first AA filter 440 is provided to prevent or reduce the likelihood of aliasing at the low sampling rate in the slow loop power measurement. The slow loop indicates average system input power and is present in previously known voltage regulator telemetry systems; it is used to measure average input power into the system. This may be done to maintain thermal budgets, cooling capacity and device skin temperature in the case of example processing platforms corresponding to mobile devices such as laptops and mobile phones.

The Vsys or Psys or Isys signal 233 from the input port 420 is also supplied, in this case without passing the system signal via the first AA filter 440 to a critical level comparator 474 which compares the system signal with a critical level threshold stored in a storage element 472. The first AA filter 440 is bypassed in this case because the sampling of the processing system signals performed at a sufficiently high sampling frequency. If the system signal input of the comparator (e.g. corresponding to Psys or Isys) exceeds or is at last equal to the predetermined critical level stored in 472, then an output of the comparator 474 may be one. Whereas if the system signal input of the comparator is less than the critical level then an output of the comparator 474 may be zero. The threshold condition for the Vsys is different, because in this case, a value of Vsys below a critical level value stored in storage element 472 may result in a non-zero comparator output so that a throttling signal may be output in response. The comparison performed by the comparator 474 is to determine whether or not the system power or system current exceeds the critical level threshold or, alternatively, to determine that a system voltage drops below a critical minimum voltage level. The critical level threshold may be supplied to the critical level data element 472 from a location 432 of the register file 446.

An output of the comparator 474 is supplied to a "debouncer" 494 and subsequently supplied to a series-connected inverter 475. The function of the debouncer 494 is to set a duration of time that an output of the comparator 474 should remain triggered (i.e. non-zero indicating that a threshold condition has been satisfied) before it is passed onto the inverter 475 input. Thus the debouncer 494 controls a minimum duration for which the processing system signal 233 (Psys, Isys or Vsys) is to be detected to be beyond the critical level stored in element 472 as a trigger for a SoC throttling signal 491 to be activated by the power monitoring circuitry 142. A register file 433 stores an encoded version of a debounce time. In this example, the same encoding scheme is used to represent the debounce time as the encoding scheme used for the processing system signal counters (462 and 466). The encoded mantissa/exponent corresponding to an appropriate debounce time is read from the register 433 and is decoded by the debounce time decoder 495 into an integer specifying the debounce time. The encoded debounce time may comprise fewer bits than the debounce time integer value supplied to the debouncer 494. The mantissa and exponent encoding scheme conveniently allows the debouncer 494 to be programmed for a wide range of values representing durations of time for which a threshold condition is satisfied (e.g. critical power exceeded or minimum voltage not reached). For example, similarly to the counter values, a 19 bit debounce time value may be stored in the register 433 as an 8-bit value yet the debounce time may be specified in small time increments of the order of μs although the 19-bit and 8-bit specific examples are non-limiting.

In the fast loop circuitry corresponding to the throttle signal 491, an XOR logic gate 490 receives as a first input signal, an output of the inverter 475 (which will be zero if Psys or Isys exceed the critical level or one if Vsys is less than the minimum voltage) as a first input and receives a system mode control signal read from a register file location 434 as a second input. The mode control signal may be set to be VSysMode=0 for power or current monitoring and be set to VSysMode=1 to perform system voltage (or "voltage droop") monitoring. In the FIG. 4 example, the SoC throttling signal 491 is an active LOW, so when both inputs to the XOR gate 490 match, the throttle signal 491 is asserted. An output of the XOR gate 490 is supplied to the SoC 410 in the event of a critical power warning being appropriate, which occurs when for at least a debounce time it is detected that at least one of: the system power exceeds a critical power threshold value; the system current exceeds a critical current threshold value; or a system voltage drops below a minimum voltage threshold. As explained above, other processing system signals such as Iadp or Ibat may be used to trigger the throttle signal. Thresholds associated with different types of system signals may differ from each other.

Similarly to the embodiment of FIG. 3, the FIG. 4 embodiment has a medium loop that comprises a first warning comparator 465 and a second warning comparator 469, each receiving as a first input the Psys or Isys or Vsys signal (in this example an analog input signal) and receiving as a second input a first warning threshold value from a first warning threshold data element 464 and a second warning threshold value from a second warning level data element 468 respectively. The first warning threshold value is read from an address 437 of the register file 446 into the first warning level element 464, whilst the second warning threshold value stored in the data element 468 is read from a different register file element 435.

The FIG. 4 arrangement differs from the FIG. 3 arrangement in that a mode control signal is provided and used to set the circuitry to either a first mode which determines that an input signal is above a threshold and increments a counter 462, 466 or outputs a throttle signal 491 accordingly or a second mode in which the circuit instead responds to the input signal being below a threshold. The mode control signal in the FIG. 4 example is a value read from a register 434 of the data telemetry registers 446 and supplied as one input to each of three XOR gates 482, 484, 490 corresponding respectively to the slow loop, the medium loop and the fast loop of FIG. 3.

When the mode signal stored in register 434 is set to Vsysmode=0, the first counter 462 and the second counter 466 increment when the input system signal 420 is at or above the respective warn 1 level 464 or warn 2 level 464 and the throttle signal 491 is output when the system signal 420 is above the critical level 472 value. For example, when the input signal 420 is Psys and Psys exceeds the warn 1 level an output of the comparator 465 is a one, which means that inputs to the first XOR gate 482 are 1 and 0, giving a high output which increments the counter 462. Thus Vsysmode=0 is appropriate for when the system signal 420 is Psys or Isys.

On the other hand when the mode signal stored in register 434 is set to Vsysmode=1, the first counter and the second counter 662 increment when the input system signal 420 is at or below the respective warn 1 level 464 or warn 2 level 464 and the throttle signal 491 is output when the system signal 420 is below the critical level 472 value This is more appropriate for when the system signal 420 is Vsys.

The FIG. 4 embodiment (unlike the FIG. 3 embodiment) has a first encoder 486 and a second encoder 488 arranged to receive output count values from the first counter 462 and the second counter 466 of the medium loop, to encode the first warning count and the second warning count such that each count can be represented by fewer bits prior their values being stored in the data telemetry registers 446. The first warning counter 462 counts events output by the first warning XOR gate 482 and supplies them to the first encoder 486 which generates an encoded count value having a number of bits less than a bit-width of the first counter 462. For example, the counter 462 may have a bit-width of 19 or 20 bits whereas the encoded count value may have a bit-width equal to a bit-width of the SVID bus 447, such as 8 bits. An output of the first data encoder 486 is written to a register file location 438 where it is accessible to the SoC 410 via theSVID bus 447.

Similarly, the second warning counter 466 counts events output by the second warning XOR gate 484 and supplies them to the second encoder 488 which generates an encoded count value having a number of bits less than a bit-width of the counter 466. An output of the second data encoder 486 is written to a register file location 436.

In the circuit of the embodiment of FIG. 4, the three XOR gates 482, 484 and 490 are "flipped" by the mode control signal input read from the register 433 to toggle between: (i) voltage droop mode (VsysMode=1) and (ii) system power or system current mode (VSysMode=0).

The first warning counter 462 and the second warning counter 466 accumulate a count while the system power input is above its respective warning threshold or alternatively accumulate a count while the system voltage drops below its monitoring threshold. The warning thresholds may be set differently for power/current monitoring and for voltage droop monitoring modes. In some examples the following mode settings apply.

Critical Power Comparator
    For VsysMode=0 (Power Monitoring or Current Monitoring): when the Psys or Isys input 420 is at or above the critical level threshold for at least a specified amount of time, the comparator 474 output asserts a hardwired signal to the platform/SoC 410 via the debouncer 494, inverter 475 and XOR gate 490. Power and current characteristics are similar in that an increase above a threshold can be monitored for both Psys and Isys to detect increased activity levels of a processing platform.

For VsysMode=1 (Voltage Droop Monitoring): when the Psys input (monitoring Vsys) is at or below the critical level threshold for a specified amount of time, the comparator 474 output asserts a hardwired signal to the platform/SoC 410 via the debouncer 494, inverter 475 and XOR gate 490.

Warning Threshold Event Counters

For VsysMode=0 (Power Monitoring or Current Monitoring): counters 462 and 466 accumulate at discrete time intervals for the duration of time that the Psys input (Psys or Isys) is at or above the respective first/second warning thresholds.

For VsysMode=1 (Voltage Droop Monitoring): counters 462 and 466 accumulate at discrete time intervals the duration of time that the Psys input (corresponding to Vsys) is at or below the respective first/second warning thresholds.

Figure 5:
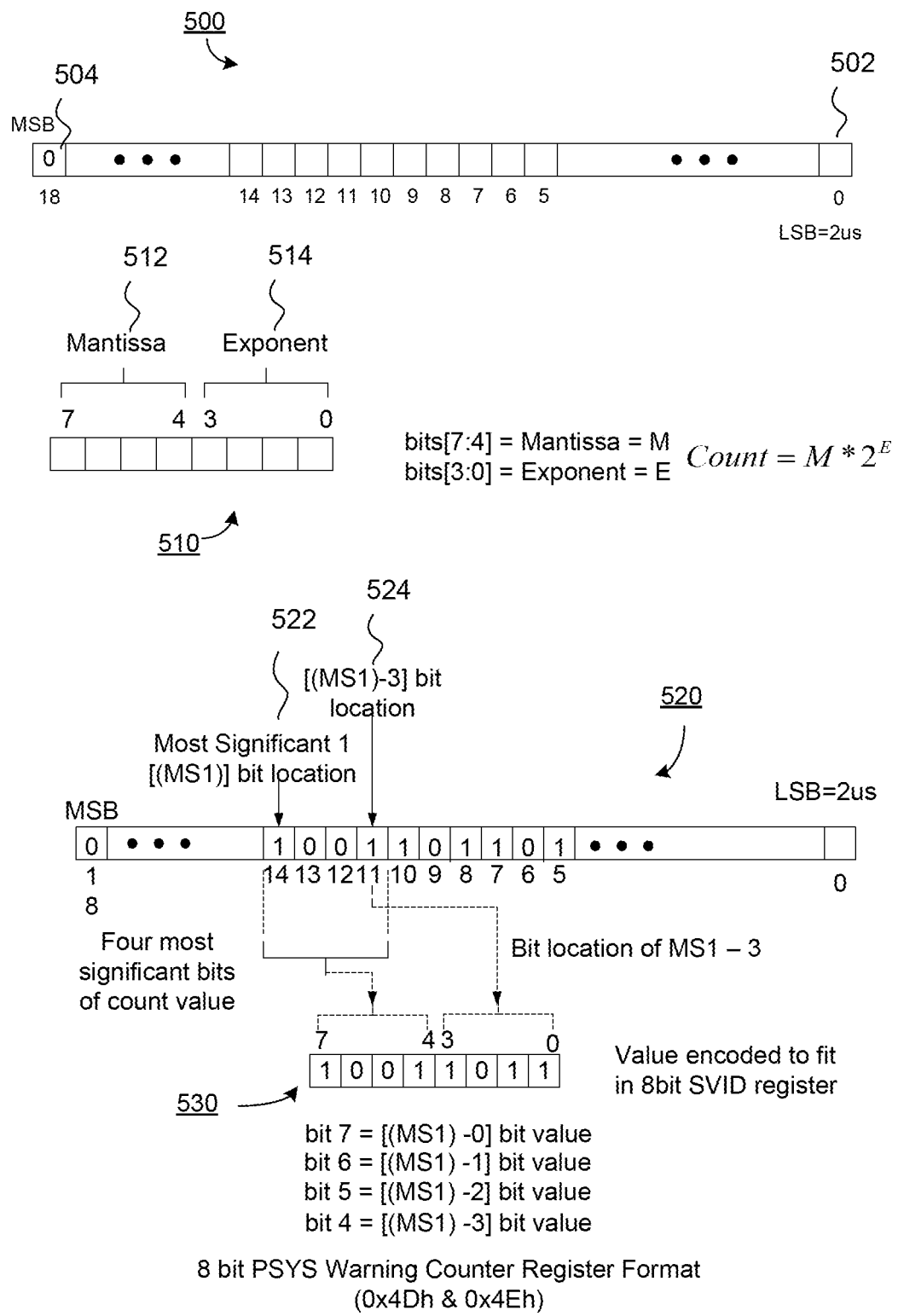
FIG. 5 schematically illustrates one example of how counter values are encoded to have a reduced number of bits relative to a counter bit-width.

FIG. 5 schematically illustrates how counter values are "encoded" to have a reduced number of bits relative to a counter bit-width according to embodiments. In this example, a bit-width of each counter 500 is 19 bits, having a least significant bit (LSB) 502 and a most significant bit (MSB) 504. The 19-bit counter 500 counts in 2 μs increments during the time the system power signal exceeds the preset threshold corresponding to the first warning threshold value or the second warning threshold value for at least a minimum duration. If the counter comprises all ones, it may stop counting and leave the register full. A full-scale count in this example corresponds to one second when the counter has 2 μs resolution because 19 bits gives values ranging from 2 μs up to $(2^{19}-1)*2$ μs, which covers up to one second. The resolution of 2 μs in this example is determined by how fast information is being received from the system power sensor at the input 412 of FIG. 4 and thus, for example a delay associated with receipt of the information may be the order of milliseconds. The counter and encoding scheme may be adapted to the 2 μs resolution or to an alternative chosen resolution to reduce the likelihood of information being lost when determining the count. The 19-bit counter 500 allows for measurement of fast peaks with microsecond resolution, whilst also reducing the SoC/processing platform read rate for the data telemetry registers 446 since the counter can run for up to one second without losing any information. Having a large bit-width of, for example, 19 bits, allows many 2 μsec counts to be registered and 19-bits covers one second. If the processing platform reads and sees all 1's when reading the encoded count from the registers 446, then it may determine that it is counting too often and respond by increasing one or more of the warning levels 464, 468 for Psys (see FIG. 4). The SoC 410 may read the encoded counts from the register file entries 436, 438 either periodically or intermittently. Reading of the encoded counts at irregular time intervals means that the availability of bandwidth on the bus can be taken into account, with more frequent readings being taken when the bus has more spare capacity. The register entries 436, 438 may be zeroed upon reading and the SoC may determine a time interval since a previous read event so that the sampling frequency of transitions across the threshold levels 464, 468 may depend upon a time between successive register reads. Use of the counters 462, 466 having comparatively high resolution compensates for relatively infrequent reading of the system registers 446 by the SoC and yet enables power profiling to be performed at a higher resolution without compromising available bus 447 bandwidth.

An 8-bit output encoded data field 510 as shown in FIG. 5 comprises a four-bit mantissa 512 concatenated with a 4-bit exponent 514. The mantissa, M, corresponds to bits four through seven of the 8-bit data field 510 whilst the exponent, E, corresponds to bits 0 through 3. The encoding can be represented by a formula:

$$\text{Count}=M*2E \quad \text{(equation 1).}$$

Once data has been read from the counter 500, the counter is zeroed and counting continues. Only a counter and a data register or other storage element need be used and there is no longer any need for a pointer register or clear bit or flag as may have been implemented in previously known systems. As shown in the bottom portion of FIG. 5, the mantissa 512 is determined based on a bit location of the MSB in the counter value being read. In this example, the most significant bit is at bit location 14 and since the mantissa is to be formed of four digits, the mantissa is formed of values of bits in positions 11 through 14. Thus in this case, the mantissa value is 1001. Since the exponent is represented in this example by a four digit value whereas the counter has a total of 19 bits, the four bit exponent has a range that covers up to a decimal value of 15. Thus it is convenient to store the value of (MSB-3) as the exponent 514 because the maximum value required to store this would conveniently be 15, which can be accommodated by the 4-bit field. The encoded value 530 comprises a mantissa value 1001 and an exponent value of 1011. The (MSB-3) bit location has a bit index of 11 in this example and the binary value 1011 corresponds to decimal value of 11. The 8-bit encoded value 530 thus conveniently fits into the 8-bit SVID register.

There are several advantages of the counter encoding technique as illustrated in FIG. 5:

(1) The read of a 19 bit count is approximated in a single 8 bit read avoiding excess bus traffic.

(2) The time resolution is adjusted automatically as the event count decreases:

a. For high counts near 1 second, where the upper 4 bits of the count register are the mantissa, the effective resolution is 65 ms ($=2^{15}*2$).

b. For low counts where the lower 4 bits of the counter register are the mantissa, and the exponent is 0, the effective resolution is 2 μs ($=2^0*2$).

In the example for FIG. 5, the mantissa is only 4-bits, so it has a relative resolution of 1/16 ($1/(2^4)$) of the exponent where the exponent bits are unpopulated (since $2^0=1$). As the count increases, the exponent increases, so the resolution being 1/16 of the exponent reduces. For example, when the value of the exponent bits is 0011 (3 in decimal), this corresponds to $2^3$ so the resolution reduces from 2 μs to 2 μs*$2^3$=16 μs. Similarly, when the exponent bit value is 1111 (15 in decimal), the resolution is reduced to 2 μs*$2^{15}$=65 ms. Thus low counts have a higher resolution and high counts have a lower resolution.

(3) By encoding the count result using a 4-bit mantissa combined with a 4-bit exponent as shown in FIG. 5, near zero mean error may be maintained, a worst case error of 6.25% and standard deviation of 2.5% using a single 8-bit register.

Further advantages include:

(1) The method by which the threshold and debounce counter values are communicated: The counter values, which are both read-back for the power-above-threshold/voltage below threshold counters and the debounce time for the critical level protection, are set according to, for example a 4-bit mantissa with 4-bit exponent format. Although the number of bits for each of the mantissa and the exponent could be set to different values, as could the number of bits of the counter and the number of bits of the encoded count value. This allows us a much larger dynamic range for applicable time windows without any special register scaling.

Thus, according to the present technique, a count value having a first number of bits is read and encoded as a value that depends on a position of the most significant bit in the determined count value. Thus, the encoded value has a higher time resolution for lower counts than for higher counts, providing flexibility for the processing platform to sample the count at a sampling rate that may vary from, for example, 2 µs up to 1 second. The ability to perform sampling of system signals such as power, current and voltage at a high sampling frequency allows power transients to be detected and allows bursty workloads to be more easily distinguished from less variable (more constant) workloads. This in turn allows for performance headroom between the power being drawn by the system and a maximum power above which system failure could occur to be utilized more efficiently. In particular, when the count in a predetermined count interval is relatively low, the processor frequency may be increased whereas if the count is relatively high, associated power transients are more likely to precipitate system failure if the processor frequency is increased. Assertions of the throttling signal may be monitored to feed back into the processor performance level adjustments.

Figure 6A:
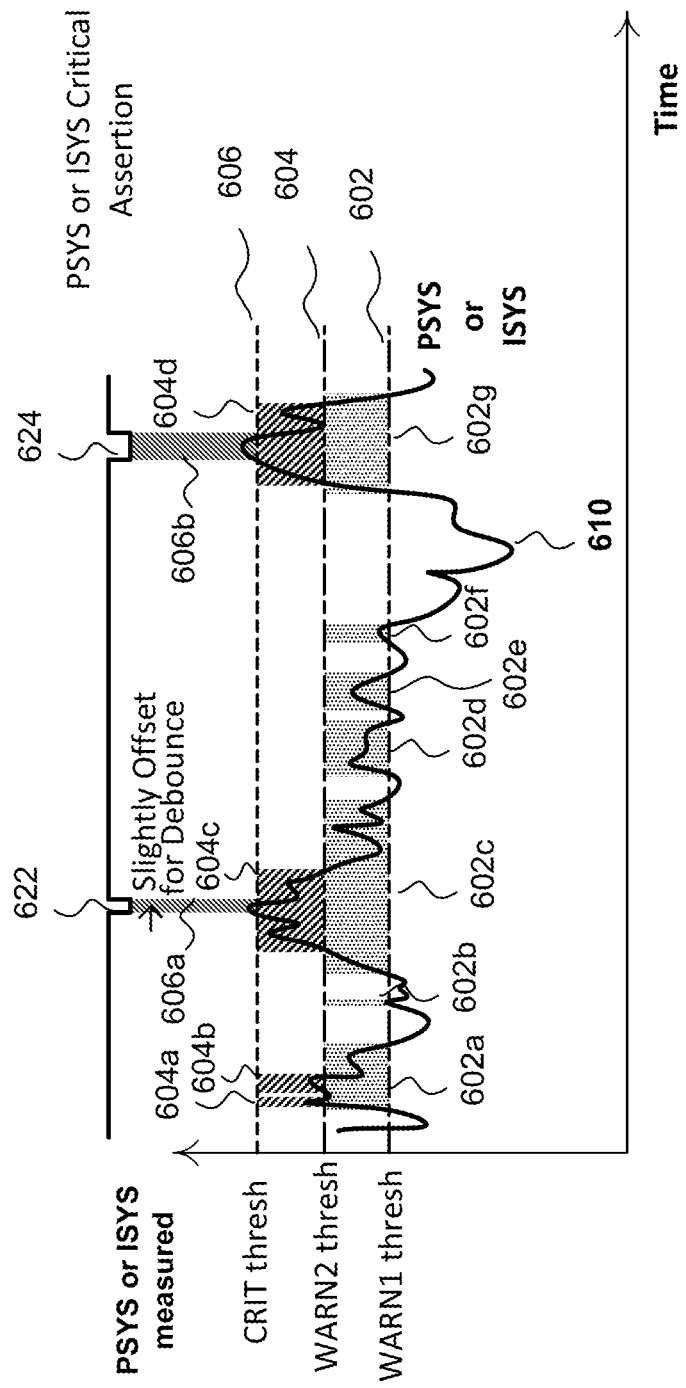
FIG. 6A schematically illustrates a power profile obtained from the power monitoring circuitry of FIG. 4 when the system is set in a system power or system current monitoring mode.

FIG. 6A schematically illustrates a power profile obtained from the power monitoring circuitry 142 of FIG. 4 when the system is set in a system power monitoring mode corresponding to VsysMode=0. The power profile is a graph of the measured system power signal Psys as a function of time. The three different system power thresholds are shown with a first warning threshold level 602 having a lowest value, a second warning threshold level 604 having a relatively higher value and a critical threshold level 606 being the highest of the three power threshold values. A power profile line 610 showing corresponding transient peaks and troughs in the processing workload running on the SoC 410 of FIG. 4 is shown on the graph together with a series of seven different blocks of time 602*a* to 602*g* for which the first warning counter 462 indicates that the system power exceeds the first warning threshold 602. The graph of FIG. 6A also shows four blocks of time 604*a* to 604*d* for which the system power level lies above the second warning threshold 604 as indicated by the second warning level counter 466.

At the top of the graph of FIG. 6A, a line corresponding to the value of the PSYS_CRIT # signal 491 (throttle signal) output by the XOR gate 490 of FIG. 4 is shown. This signal has two brief time intervals 622 and 624 where the signal peaks above its typical value corresponding to the critical warning threshold 606 being exceeded by the processing workload. In the example of FIG. 6A, the warning thresholds are set such that the second warning threshold 604 is greater than the first warning threshold 602. However, in alternative examples the second warning threshold could be less than the first warning threshold and the two thresholds may be independent.

Figure 6B:
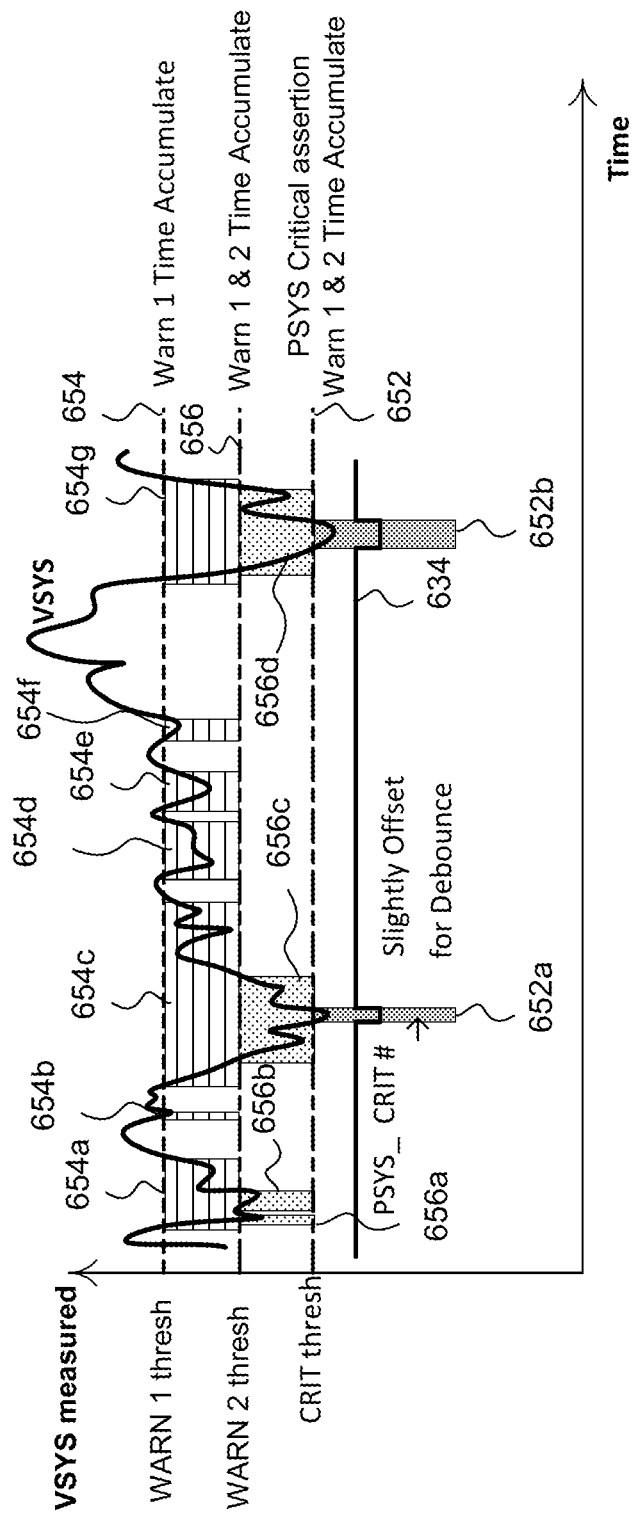
FIG. 6B schematically illustrates a system voltage profile of a processing workload executing on a System on Chip.

FIG. 6B schematically illustrates a system voltage profile of a processing workload executing on the SoC 410 and rest of system obtained when the mode control signal is set to Vsysmode=1. In this case the critical threshold corresponds to a drop in voltage level below a minimum level corresponding to a critical threshold value 652. In this example the warning thresholds are set such that the second warning threshold 656 is less than the first warning threshold 654. As before, the two warning thresholds 654, 656 are independent. As shown in the graph of FIG. 6B, there are seven blocks of time 654*a* to 654*g* where the voltage profile drops below the uppermost first warning threshold 654. There is a set of four blocks of time 656*a* to 656*d* corresponding to the voltage level dropping even further such that it lies below the second warning threshold level 656. The system drops below a minimum critical threshold voltage level 652 for two periods of time 652*a* and 652*b* as indicated by dips in the critical signal value 634.

The ability of the power monitoring circuitry 142 of the embodiments to monitor power events in the system and to alert within microseconds of an extreme power condition that could cause a system crash may be important for handling situations where the system power being drawn due to processing operations exceeds the power delivery capability of the power source of the system. The power profiling and voltage profiling according to the embodiments allows the power monitoring circuitry 142 to control the SoC power levels to opportunistically use power supply headroom detected to be available as a result of the higher sampling rates for the system signal(s) for added performance. The counters according to the present technique, which are capable of counting at a 1 µs or 2 µs rate, for example, allow for measurement of fast peaks with microsecond resolution and the way that the counter values are encoded via mantissa/exponent encoding to reduce the number of bits allows the bus bandwidth to be more efficiently used and also allows for a large dynamic count range with high-resolution and automatic resolution adjustment with the event count. This is possible via the definition of the mantissa value according to a fixed number of bits starting with the position of the most significant non-zero bit of a count value being read. It will be appreciated that the present technique is not limited to a particular binary representation so, for example, the most significant bit could be represented by a zero value rather than a non-zero value indicating a position of the most significant bit. The reading of a 19 bit count, for example, is approximated in a single 8-bit read operation to reduce bandwidth used by the high resolution power profiling data avoids excess bus traffic. Embodiments allow a system input power of a processing platform (e.g. a SoC) to be adjusted such that it may be nearly constant and at the limit of the power supply capability for workloads regardless of the workload being constant-duty or bursty in nature. A physical monitoring device may be provided to generate a signal indicative of the system input power.

Figure 7:
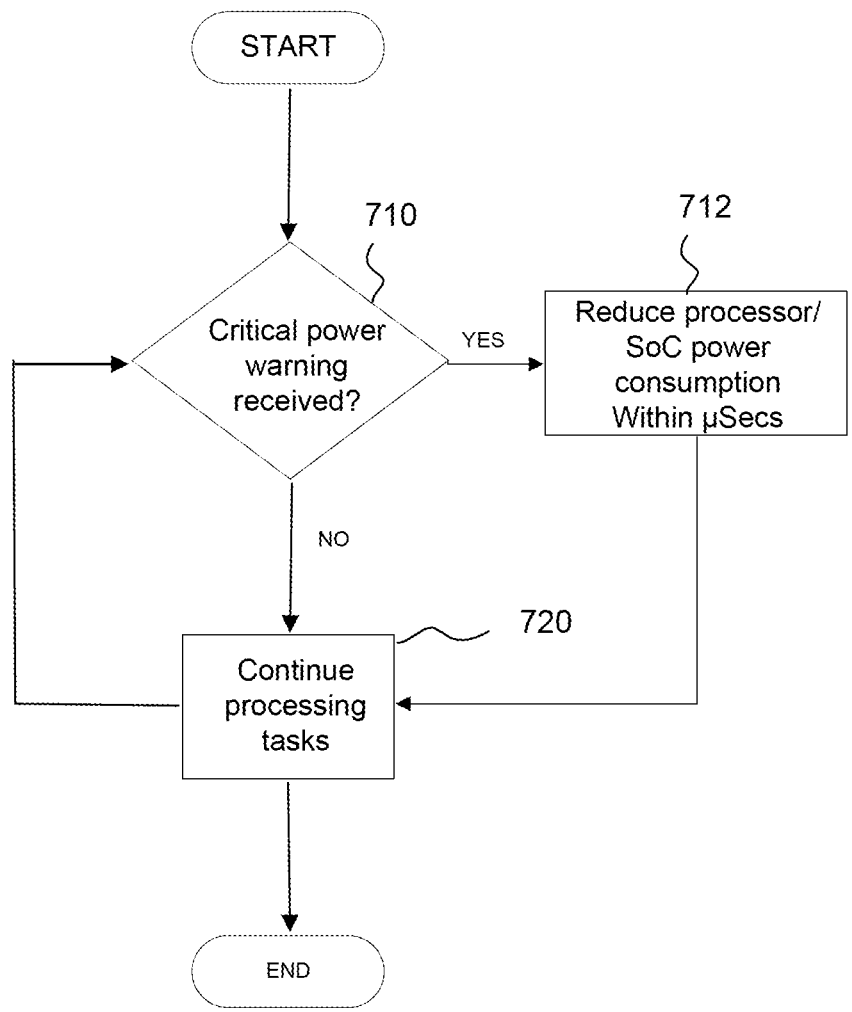
FIG. 7 is a flowchart that schematically illustrates how processor power management circuitry may respond to receipt of a system critical warning signal.

FIG. 7 is a flowchart schematically illustrating how processor power management circuitry may respond to receipt of the system critical warning signal (throttle signal) 491 of, for example the FIG. 4 embodiment. At process element 710 the SoC 410 determines whether or not the critical power warning signal has been received. The signal provided from the power monitoring circuitry 142 may be a hardwired signal, so the monitoring may be continuous. If at stage 710 no critical system warning signal 491 has been asserted then processing tasks continue at processing element 720 and the monitoring for receipt of the signal at process element 710 also continues. However, if at process element 710 a critical power warning signal is in fact received, then the process proceeds to process element 712 where at least one of the SOC power or the processor power is rapidly reduced (within µs) to reduce the likelihood of a crash due to the maximum available input power from the power supply having been exceeded. Decreasing a power consumption of the processor may prevent or at least reduce the likelihood of input power supply voltage collapses. This conveniently provides protection against processing errors or inadvertent system shutdown.

Figure 8:
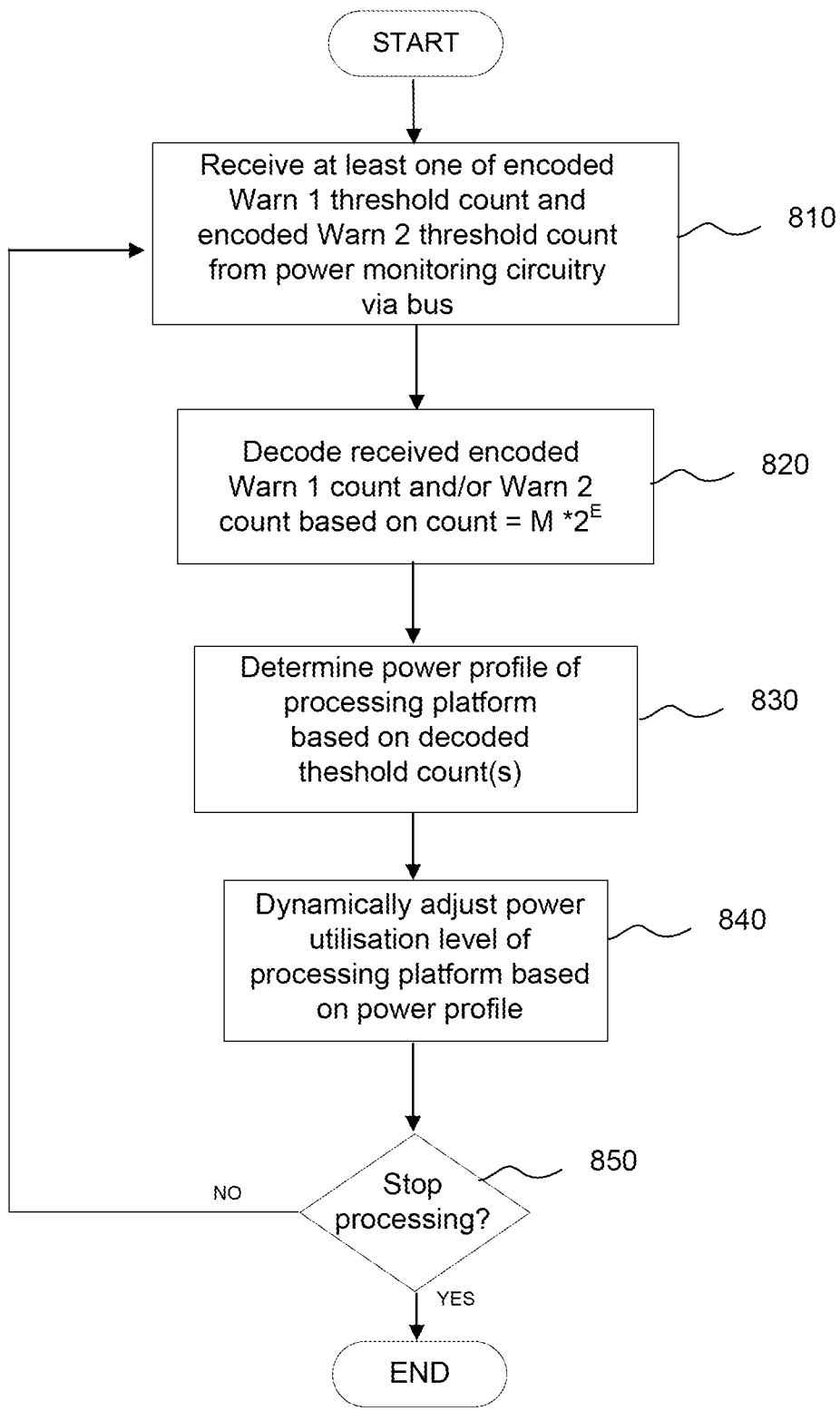
FIG. 8 is a flowchart that schematically illustrates a process via which power management circuitry may utilize output of the power monitoring circuitry to adjust SoC or processor power levels to use available power supply headroom

FIG. 8 is a flowchart schematically illustrating how power management circuitry may utilize output of the power monitoring circuitry 142 of the embodiments to adjust SoC or processor power levels to use available power supply headroom to enhance processing performance. Power levels of one or more CPU cores, memory or any other system component may be actively reduced in response to measurements made by the power monitoring circuitry 142. The process begins at element 810, where at least one encoded threshold count is received by a power control unit 144 from a bus such as the SVID bus 447 (see FIG. 4). The received threshold counts may correspond to at least one of the first warning threshold count 462 or the second warning threshold count 466. Next, at element 814, the power control unit 144 decodes the encoded counter values using the formula count=$M*2^E$. The counter values are decoded and tracked as a function of time as they are read from the SVID bus 447 by the SoC 410 to generate at process element 816 a power profile as shown in FIG. 6A or a voltage profile as shown in FIG. 6B.

The SoC 410 may read the SVID counter data when possible and it can be assumed by the power control unit in the SoC 410 that the count value has accumulated in a time taken to read the respective encoded count value from the register file location 436 or 438. Thus, for example, if there is only one count and the SoC 410 took 10 seconds to read the encoded counter value, it is determined that only one event has occurred in that 10 seconds read duration. If, on the other hand, a counter 462, 466 is full at 1 second of count based on reading the corresponding register file location 436, 438, then the SoC 410 may merely determine that there was at least one second of events but there could have been more, so it may adjust at least one of the warn 1 level 464 or the warn 2 level 468 to higher values higher or, alternatively, try to perform a read from the SVID bus 447 more rapidly next time. Based on the system power profile or system voltage profile as a function of time, the power control circuitry of the processor 150 at process element 818 dynamically adjusts the processor power utilization level up or down when low or high counts in the power profile are detected. At process element 820 the process iterates for as long as processing tasks are executed, but terminates when processing stops.

Where functional units have been described as circuitry, the circuitry may be general purpose processor circuitry configured by program code to perform specified processing functions. The circuitry may also be configured by modification to the processing hardware. Configuration of the circuitry to perform a specified function may be entirely in hardware, entirely in software or using a combination of hardware modification and software execution. Program instructions may be used to configure logic gates of general purpose or special-purpose processor circuitry to perform a processing function. Circuitry may be implemented, for example, as a hardware circuit comprising custom Very Large Scale Integrated, VLSI, circuits or gate arrays, off-the-shelf semiconductors such as logic chips, transistors, or other discrete components. Circuitry may also be implemented in programmable hardware devices such as field programmable gate arrays, FPGA, programmable array logic, programmable logic devices, A System on Chip, SoC, or the like.

Machine readable program instructions may be provided on a transitory medium such as a transmission medium or on a non-transitory medium such as a storage medium. Such machine readable instructions (computer program code) may be implemented in a high level procedural or object oriented programming language. However, the program(s) may be implemented in assembly or machine language, if desired. In any case, the language may be a compiled or interpreted language, and combined with hardware implementations. Program instructions may be executed on a single processor or on two or more processors in a distributed manner.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). The same applies to a phrase in the form "at least one of A, B, or C".

EXAMPLES

The following examples pertain to the present technique.
1. Power monitoring circuitry to monitor a system power profile of processing tasks executing on a processing platform, the power monitoring circuitry comprising:
   an input to receive from the processing platform, a processing system signal indicating a power being consumed by the processing platform;
   a counter to store a count value corresponding to an accumulated number of times that a warning threshold condition associated with a warning threshold value is satisfied by the received processing system signal in a count-accumulation time interval; and
   wherein the count value is supplied to a power control circuit of the processing platform via a bus in response to a read request from the power control circuit, the power control circuit being responsive to the count value to control a performance level of the processing platform.
2. Power monitoring circuitry may be the subject-matter of example 1, comprising a critical level comparator to compare the processing system signal with a critical threshold value and to determine if a critical threshold condition is triggered; and
   throttle signal output circuitry to assert a throttle signal to the processing platform to activate a power-reducing feature of one or more components of the processing platform when the critical comparator indicates that the critical threshold condition is triggered.
3. Power monitoring circuitry may be the subject matter of example 1 or example 2, comprising at least one further warning comparator to perform a respective further comparison and at least one further counter to store a respective further count value and wherein the at least one further count value is supplied to a power control circuit of the processing platform via a bus in response to a read request from the power control circuit, the power control circuit being responsive to the at least one further count value to control a performance level of the processing platform.
4. Power monitoring circuitry may be the subject matter of any one of example 1 to example 3, wherein the processing system signal is one of a power signal, a voltage signal and a current signal.
5. Power monitoring circuitry may be the subject matter of example 4, comprising mode setting circuitry to set the power monitoring circuitry to operate in a first monitoring mode in which the warning threshold condition corresponds to at least one of the system power signal or system current signal being at or above the warning threshold value or to operate in a second monitoring mode in which the warning threshold condition corresponds to the system voltage signal being at or below the warning threshold value.

6. Power monitoring circuitry may be the subject matter of any one of examples 1 to 5, wherein the count value is read by the power control circuit of the processing platform at a reading rate having a first time interval between successive read events and wherein the counter has a count resolution corresponding to a second time, wherein the first time interval is greater than the second time.

7. Power monitoring circuitry may be the subject matter of example 6, wherein when the count value is determined to be approaching saturation, the power control circuitry is arranged to at least one of: increase the reading rate or adjust the warning threshold value to reduce a likelihood of saturation occurring.

8. Power monitoring circuitry may be the subject matter of example 2, wherein the power control circuit is responsive to the count value to associate a low count value with a less-bursty workload having a given average power and to associate a high count value with a more bursty workload having the given average power and to increase an operating frequency of at least one processor of the processing platform when the workload is determined to be less bursty.

9. Power monitoring circuitry may be the subject matter of example 8, wherein the increase in the operating frequency for the less bursty workloads is controlled by the power control circuit depending on a rate of assertion of the throttle signal.

10. Power monitoring circuitry may be the subject matter of any one of examples 1 to 9, comprising a count encoder to perform a conversion of the count value obtained from the warning counter, the count value having a first number of bits, to an encoded count value having a second number of bits less than the first number of bits, the encoded count value depending upon a position of a most significant bit of the count value.

11. Power monitoring circuitry may be the subject matter of example 10, wherein the counter encoder comprises a first bit field to represent a mantissa and a second bit field to represent an exponent corresponding to the first warning count value.

12. Power monitoring circuitry may be the subject matter of example 11, wherein the mantissa of the encoded first warning count value comprises a number of contiguous bits of the count value starting from the most significant bit and including a number of bits equal to a width of the first bit field.

13. Power monitoring circuitry may be the subject matter of example 11 or example 12, wherein a sum of the first bit field and the second bit field of the first counter encoder is equal to a width of the bus.

14. Power monitoring circuitry may be the subject matter of any one of examples 1 to 13, wherein the counter is to increment the count value at a count resolution of 10 microseconds or less.

15. Power monitoring circuitry may be the subject matter of any one of example 1 to 14, wherein the bus is a serial transmission interface to connect power control circuit to the processing platform, the serial transmission interface having a clock, and interrupt and a data wire.

16. Power monitoring circuitry may be the subject matter of any one of examples 1 to 15, comprising a warning threshold register to store a value corresponding to the warning threshold.

17. Power monitoring circuitry may be the subject matter of example 2, comprising a debouncer to control a debounce time corresponding to a minimum duration for which the processing system signal is to sustain traversal of the critical threshold value to trigger output of the throttle signal.

18. Power monitoring circuitry according to example 17, comprising a debounce time decoder to receive from a storage element an encoded value for the debounce time, the encoded value having a first number of bits and to decode the encoded value to supply to the debouncer a debounce time having a second number of bits greater than the first number of bits.

19. A voltage regulator for a processor comprising the power monitoring circuitry of any one of examples 1 to 18.

20. A battery charger comprising the power monitoring circuitry of any one of examples 1 to 18.

21. A power supply for a server or for a desktop computer comprising the power monitoring circuitry of any one of examples 1 to 18.

22. An apparatus comprising:
at least one processor;
power control circuitry to control a performance level of the at least one processor; and
the power monitoring circuitry of any one of examples 1 to 18.

23. The apparatus of example 22 comprising one of: a mobile phone, a desktop computer and a mobile computer.

24. Power control circuitry for a processing platform, comprising:
an input to receive from the processing platform at least one count value, the count value corresponding to an accumulated number of times that a warning threshold condition associated with a warning threshold value is satisfied by a processing system signal of the processing platform in a count-accumulation time interval; and
power level adjustment circuitry for the processing platform to adjust a performance level of at least one component controlled by the processing platform based on the count value.

25. Power control circuitry may be the subject matter of example 24 comprising:
an input to receive from the processing platform, a critical warning signal indicating that a critical threshold condition has been triggered, the triggering indicating that a load power of the processing platform exceeds a power delivery limit of a power source; and
power level adjustment circuitry for the processing platform to reduce a power consumption of the processing platform responsive to receipt of the critical warning signal.

26. Power level control circuitry may be the subject matter of example 25, wherein the power level adjustment circuitry is to adjust a power level utilization level of the processing platform based on the count value and the critical warning signal to maintain a stable system input power.

27. Machine readable instructions provided on at least one machine-readable medium, the machine-readable instructions, when executed, to cause processing hardware to:

receive from a processing platform, a processing system signal indicating a power being consumed by the processing platform;
store a count value corresponding to an accumulated number of times that a warning threshold condition associated with a warning threshold value is satisfied by the received processing system signal in a count-accumulation time interval; and
output the count value to a power control circuit of the processing platform via a bus in response to a read request from the power control circuit, the power control circuit being responsive to the count value to control a performance level of the processing platform.

28. Machine readable instructions may be the subject matter of example 27, comprising machine-readable instructions, when executed, to cause processing hardware to:
receive a critical warning signal indicating that a critical threshold condition has been triggered corresponding to a load power of a processing platform exceeding a power delivery limit of a power source; and
reduce a power consumption of the processing platform responsive to receipt of the critical power warning signal.

29. Machine readable instructions may be the subject matter of example 27 or example 28, comprising machine-readable instructions, when executed, to cause processing hardware to:
adjust a power level utilization level of at least one component of the processing platform based on at least one of the threshold count and the critical power warning signal to maintain a stable system input power drawn from a power supply below the critical threshold regardless of a processing workload of the processing platform being constant-duty or bursty in nature.

30. Power monitoring circuitry to monitor a system power profile of processing tasks executing on a means for processing, the power monitoring circuitry comprising:
means for to receiving from the means for processing, a processing system signal indicating a power being consumed by the means for processing;
means for counting to store a count value corresponding to an accumulated number of times that a warning threshold condition associated with a warning threshold value is satisfied by the received processing system signal in a count-accumulation time interval; and
wherein the count value is supplied to a means for power control circuit of the means for processing platform via a bus in response to a read request from the means for power control circuit, the means for power control being responsive to the count value to control a performance level of the means for processing 31. A method for monitoring a system power profile of processing tasks executing on a processing platform, the method comprising:
receiving from a processing platform, a processing system signal indicating a power being consumed by the processing platform;
storing a count value corresponding to an accumulated number of times that a warning threshold condition associated with a warning threshold value is satisfied by the received processing system signal in a count-accumulation time interval; and
outputting the count value to a power control circuit of the processing platform via a bus in response to a read request from the power control circuit, the power control circuit being responsive to the count value to control a performance level of the processing platform.

32. The method of example 31 comprising:
receiving a critical warning signal indicating that a critical threshold condition has been triggered corresponding to a load power of a processing platform exceeding a power delivery limit of a power source; and
reducing a power consumption of the processing platform responsive to receipt of the critical power warning signal.

The invention claimed is:

1. Power monitoring circuitry to monitor a system power profile of processing tasks executing on a processing platform, the power monitoring circuitry comprising:
an input to receive, from the processing platform, a processing system signal indicating a power being consumed by the processing platform; and
a counter to store a count value corresponding to an accumulated number of times that a warning threshold condition associated with a warning threshold value is satisfied by the received processing system signal in a count-accumulation time interval; and
mode setting circuitry to set the power monitoring circuitry to operate in a first monitoring mode in which the warning threshold condition corresponds to at least one of a power signal or a current signal being at or above the warning threshold value or to operate in a second monitoring mode in which the warning threshold condition corresponds to a voltage signal being at or below the warning threshold value;
wherein the count value is supplied to a power control circuit of the processing platform via a bus in response to a read request from the power control circuit, the power control circuit being responsive to the count value to control a performance level of the processing platform.

2. Power monitoring circuitry as claimed in claim 1, comprising a critical level comparator to compare the processing system signal with a critical threshold value and to determine if a critical threshold condition is triggered; and
throttle signal output circuitry to assert a throttle signal to the processing platform to activate a power-reducing feature of one or more components of the processing platform when the critical level comparator indicates that the critical threshold condition is triggered.

3. Power monitoring circuitry as claimed in claim 2, wherein the power control circuit is responsive to the count value to associate a low count value with a less bursty workload having a given average power and to associate a high count value with a more bursty workload having the given average power and to increase an operating frequency of at least one processor of the processing platform when the workload is determined to be less bursty.

4. Power monitoring circuitry as claimed in claim 3, wherein the increase in the operating frequency for the less bursty workloads is controlled by the power control circuit depending on a rate of assertion of the throttle signal.

5. Power monitoring circuitry as claimed in claim 4, comprising a count encoder to perform a conversion of the count value obtained from the counter, the count value having a first number of bits, to an encoded count value having a second number of bits less than the first number of bits, the encoded count value depending upon a position of a most significant bit of the count value.

6. Power monitoring circuitry as claimed in claim 5, wherein the count encoder comprises a first bit field to represent a mantissa and a second bit field to represent an exponent corresponding to the count value.

7. Power monitoring circuitry as claimed in claim 6, wherein the mantissa of the encoded count value comprises a number of contiguous bits of the count value starting from the most significant bit and including a number of bits equal to a width of the first bit field.

8. Power monitoring circuitry as claimed in claim 2, comprising a debouncer to control a debounce time corresponding to a minimum duration for which the processing system signal is to sustain traversal of the critical threshold value to trigger output of the throttle signal.

9. Power monitoring circuitry according to claim 8, comprising a debounce time decoder to receive from a storage element an encoded value for the debounce time, the encoded value having a first number of bits and to decode the encoded value to supply to the debouncer a debounce time having a second number of bits greater than the first number of bits.

10. Power monitoring circuitry as claimed in claim 1, wherein the count value is read by the power control circuit of the processing platform at a reading rate having a first time interval between successive read events and wherein the counter has a count resolution corresponding to a second time interval, wherein the first time interval is greater than the second time interval.

11. Power monitoring circuitry as claimed in claim 10, wherein when the count value is determined to be approaching saturation, the power control circuit is arranged to at least one of: increase the reading rate or adjust the warning threshold value to reduce a likelihood of saturation occurring.

12. Power monitoring circuitry as claimed in claim 1, wherein the power monitoring circuitry is included in a voltage regulator for a processor.

13. Power monitoring circuitry as claimed in claim 1, wherein the power monitoring circuitry is included in a battery charger.

14. Power monitoring circuitry as claimed in claim 1, wherein the power monitoring circuitry is included in a power supply for a server or for a desktop computer.

15. Power monitoring circuitry to monitor a system power profile of processing tasks executing on a processing platform, the power monitoring circuitry comprising:
an input to receive, from the processing platform, a processing system signal indicating a power being consumed by the processing platform; and
a counter to store a count value corresponding to an accumulated number of times that a warning threshold condition associated with a warning threshold value is satisfied by the received processing system signal in a count-accumulation time interval;
wherein the count value is supplied to a power control circuit of the processing platform via a bus in response to a read request from the power control circuit, the power control circuit being responsive to the count value to control a performance level of the processing platform; and
wherein when the count value is determined to be approaching saturation, the power control circuit is arranged to at least one of: increase a reading rate or adjust the warning threshold value to reduce a likelihood of saturation occurring.

16. Power monitoring circuitry as claimed in claim 15, wherein the count value is read by the power control circuit of the processing platform at a reading rate having a first time interval between successive read events and wherein the counter has a count resolution corresponding to a second time interval, wherein the first time interval is greater than the second time interval.

17. Power monitoring circuitry as claimed in claim 15, comprising a critical level comparator to compare the processing system signal with a critical threshold value and to determine if a critical threshold condition is triggered; and
throttle signal output circuitry to assert a throttle signal to the processing platform to activate a power-reducing feature of one or more components of the processing platform when the critical level comparator indicates that the critical threshold condition is triggered.

18. Power monitoring circuitry as claimed in claim 15, wherein the processing system signal is a power signal, a voltage signal, or a current signal.

19. An apparatus comprising:
a processing platform including a power control circuit; and
power monitoring circuitry coupled to the processing platform, the power monitoring circuitry including:
an input to receive, from the processing platform, a processing system signal indicating a power being consumed by the processing platform;
a counter to store a count value corresponding to an accumulated number of times that a warning threshold condition associated with a warning threshold value is satisfied by the received processing system signal in a count-accumulation time interval, wherein the count value is supplied to the power control circuit of the processing platform;
a critical level comparator to compare the processing system signal with a critical threshold value and to determine if a critical threshold condition is triggered; and
throttle signal output circuitry to assert a throttle signal to the processing platform to activate a power-reducing feature of one or more components of the processing platform when the critical level comparator indicates that the critical threshold condition is triggered;
wherein the power control circuit is to:
determine to increase an operating frequency of at least one processor of the processing platform based on the count value and an average power of the processing platform; and
control the increase in the operating frequency based on a rate of assertion of the throttle signal.

20. The apparatus as claimed in claim 19, wherein it is determined to increase the operating frequency of the at least one processor based on the count value being relatively low for the average power.

21. The apparatus as claimed in claim 19, wherein the power monitoring circuitry further includes a count encoder to perform a conversion of the count value obtained from the counter, the count value having a first number of bits, to an encoded count value having a second number of bits less than the first number of bits, the encoded count value depending upon a position of a most significant bit of the count value.

22. The apparatus as claimed in claim 21, wherein the count encoder comprises a first bit field to represent a mantissa and a second bit field to represent an exponent corresponding to the count value.

23. The apparatus as claimed in claim 22, wherein the mantissa of the encoded count value comprises a number of contiguous bits of the count value starting from the most significant bit and including a number of bits equal to a width of the first bit field.

24. Power monitoring circuitry to monitor a system power profile of processing tasks executing on a processing platform, the power monitoring circuitry comprising:
- an input to receive from the processing platform, a processing system signal indicating a power being consumed by the processing platform; and
- a counter to store a count value corresponding to an accumulated number of times that a warning threshold condition associated with a warning threshold value is satisfied by the received processing system signal in a count-accumulation time interval, wherein the count value is supplied to a power control circuit of the processing platform via a bus, the power control circuit being responsive to the count value to control a performance level of the processing platform;
- a critical level comparator to compare the processing system signal with a critical threshold value and to determine if a critical threshold condition is triggered;
- throttle signal output circuitry to assert a throttle signal to the processing platform to activate a power-reducing feature of one or more components of the processing platform when the critical comparator indicates that the critical threshold condition is triggered; and
- a debouncer to control a debounce time corresponding to a minimum duration for which the processing system signal is to sustain traversal of the critical threshold value to trigger output of the throttle signal.

25. Power monitoring circuitry according to claim 24, comprising a debounce time decoder to receive an encoded value for the debounce time, the encoded value having a first number of bits and to decode the encoded value to supply to the debouncer a debounce time having a second number of bits greater than the first number of bits.

* * * * *